United States Patent

[11] 3,609,708

[72] Inventors Harvey G. Cragon
Dallas;
William D. Kastner, Richardson, both of Tex.
[21] Appl. No. 787,785
[22] Filed Dec. 30, 1968
[45] Patented Sept. 28, 1971
[73] Assignee Texas Instruments Incorporated
Dallas, Tex.

[54] OPTIMIZED READ ONLY MEMORY USING TAG BITS
7 Claims, 3 Drawing Figs.

[52] U.S. Cl. .......... 340/173 SP, 340/173 R
[51] Int. Cl. .......... G11c 17/00, G11c 5/02, G11c 7/00
[50] Field of Search .......... 340/173, 166

[56] References Cited

UNITED STATES PATENTS 3,171,100 2/1965 Rajchman .......... 340/173
3,430,211 2/1969 Foure .......... 340/173 X

*Primary Examiner*—Bernard Konick
*Assistant Examiner*—Stuart Hecker
*Attorneys*—Samuel M. Mims, Jr., James O. Dixon, Andrew M. Hassell, Harold Levine, Rene' E. Grossman, Melvin Sharp and Richards, Harris & Hubbard

ABSTRACT: Word length limitations on "read only" memories due to limited driving capability of a single word driver and the limitations upon the number of words which can be stored due to the limited number of inputs to OR gates at the memory output are minimized by complementing each row in the memory matrix and each column in the memory matrix when the number of ones in a given row or column is greater than one-half the number of bits in the row or column respectively and storing a first set of tag bits representative of the rows complemented and the second set of tag bits representative of the columns complemented. Means are provided for reading from the sets of tag bits when reading data represented by bits in the memory rows and columns.

PATENTED SEP 28 1971

3,609,708

OPTIMIZED READ ONLY MEMORY USING TAG BITS

This invention relates to read only memories in digital computing machines and more particularly to enhancing the operating capabilities of the memory by selectively complementing both the rows and the columns of the memory matrix until the number of ones in any row and in any column is less than one-half the number of bits in any row or column and at the same time storing tag bits representative of the rows and columns complemented.

It is known that read only memories are limited due to the limited driving capability of a single word driver. They are further limited in the number of words which can be stored due to the limited number of inputs of OR gates at the memory output.

The present invention is directed to providing a maximum of output information from a memory by minimizing the number of bits stored therein. The desirability of having a small power requirement in a memory matrix is disclosed in U.S Pat. No. 2,976,520 to Reenstra. A solution to this problem has been approached by minimizing the number of components through the use of a cyclic binary code as disclosed in U.S Pat. No. 3,146,436 to Cros. In the U.S. Pat. No. 2,811,713 to Spencer it is made clear that memory matrices may become unreliable as the size thereof is increased.

In accordance with the present invention the operating capabilities of a read only memory are enhanced by selectively complementing each row and each column of the memory matrix until the number of ones stored in any row or any column of the read only memory matrix is not more than one-half the number of bits in the memory row or memory column respectively. At the same time, a first set of tag bits are stored as to represent the rows complemented and a second set of tag bits are stored to represent the columns complemented.

In a more specific aspect, a memory matrix is provided wherein the presence or absence of an element such as a resistor of diode signifies a one or a zero respectively. In applicant's memory system, each row and column of said matrix is the complement of the row or column having more ones therein than one-half the number of bits in a given row or column. Means are provided for storing one tag bit for each row complemented and one tag bit for each column complemented, the latter being readable along with the memory.

For a more complete understanding of the present invention and for further objects and advantages thereof, reference may now be had to the following description taken in conjunction with the accompanying drawings in which.

Two techniques are commonly used in the design of a read only memory. The first is the use of a device which has two stable states for each of the memory elements. The second is the use of some device such as a diode or resistor which, if present, signifies a one and, if absent, signifies a zero. It is this second type of read only memory to which this invention relates.

Figure 1:
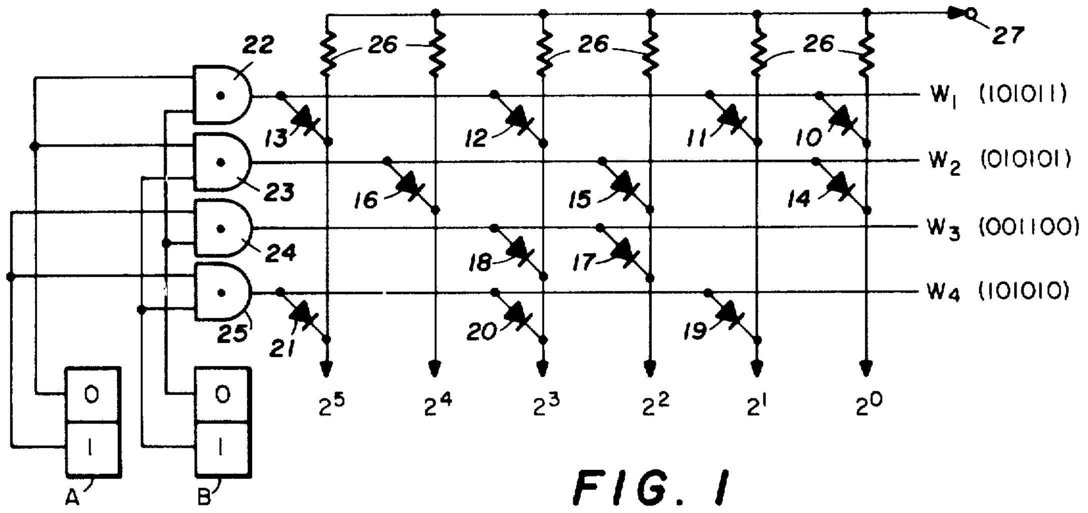
FIG. 1 is a circuit diagram of a four word, six bit, read only memory.

In FIG. 1, for example, a four word six bit per word memory has been shown. There are four word lines $W_1$, $W_2$, $W_3$ and $W_4$. There are six bit lines $2^0$–$2^5$ inclusive. Diodes 10–13 connect word line $W_1$ to bit lines $2^0$, $2^1$, $2^3$, and $2^5$ respectively. Diodes 14–16 connect word lines $W_1$ to bit lines $2^0$, $2^2$ and $2^4$ respectively. Diodes 17 and 18 connect word line $W_3$ to bit lines $2^2$ and $2^3$ respectively. Diodes 19, 20 and 21 connect word line $W_4$ to bit lines $2^1$, $2^3$ and $2^5$ respectively.

Two decoding flip-flops A and B are connected by way of AND gates 22–25 to the word lines $W_1$–$W_4$. The bit lines $2^0$–$2^5$ are connected by way of resistors 26 to a minus supply terminal 27.

In this matrix, the four word lines $W_1$–$W_4$ selectively are energized by the output states from the decoding address flip-flops A and B. Any of the lines may be decoded by applying a one-state voltage thereon, as is well known in the art. When this happens, the diodes at the intersections leading to the bit lines cause output states representing ones to appear on the bit lines.

There are two problems which exist in the design of such a memory. The first problem is that each of the AND gates 22–25 must be capable of driving as many loads as there are bits in the word. This is not difficult for the six bit case illustrated in FIG. 1, however, it poses a severe problem for word lengths greater than the driving capability of a single word driver.

The second problem is that each OR gate must have as many inputs as there are words in the memory. This is not a major problem for the four word memory illustrated in FIG. 1 but for memories with larger number of words it becomes a severe problem.

In accordance with the present invention, the two problems above mentioned are minimized by the complementing the rows and columns of the matrix until the number of ones in any row and in any column does not exceed one-half the number of bits in any row or column respectively. At the same time, a set of tag bits is stored for representing each row that has been complemented. Another set of tag bits is stored for representing the number of columns that are complemented.

The design of such a read only memory may be approached by progressively considering the same from the standpoint of both rows and columns until the desired configuration is reached.

By way of example, the bit pattern illustrated in FIG. 1 indicates that there are 12 ones and 12 zeros in this pattern. The pattern is represented by table I.

TABLE I

| | |
|---|---|
| $W_1$ | 101011 |
| $W_2$ | 010101 |
| $W_3$ | 001100 |
| $W_4$ | 101010 |

To reduce the load on each driver, the complement of each row is taken when the number of ones is greater than one-half the number of bits. For example, row 1 has four ones, so its complement is taken. An additional bit position is employed in the memory to store a tag bit for each row which is complemented. Thus the change together with the tag bit storage is represented in table II.

TABLE II

| | | | | | | | | |
|---|---|---|---|---|---|---|---|---|
| $W_1$ | 0 | 1 | 0 | 1 | 0 | 0 | 1 | word control tag bit. |
| $W_2$ | 0 | 1 | 0 | 1 | 0 | 1 | 0 | |
| $W_3$ | 0 | 0 | 1 | 1 | 0 | 0 | 0 | |
| $W_4$ | 1 | 0 | 1 | 0 | 1 | 0 | 0 | |

It will now be seen that the $2^2$ column of table II contains three ones. A second step to now be taken is to complement this column. A bit control word (BCW) is also stored in memory to indicate the columns that are complemented. With column 4 complemented, the matrix is as shown in table III.

TABLE III

| | | | | | | | | |
|---|---|---|---|---|---|---|---|---|
| $W_1$ | 0 | 1 | 0 | 0 | 0 | 0 | 1 | |
| $W_2$ | 0 | 1 | 0 | 0 | 0 | 1 | 0 | |
| $W_3$ | 0 | 0 | 1 | 0 | 0 | 0 | 0 | |
| $W_4$ | 1 | 0 | 1 | 1 | 1 | 0 | 0 | |
| BCW | 0 | 0 | 0 | 1 | 0 | 0 | 0 | bit control word. |

Having complemented the $2^2$ column, it will now be seen that the word $W_4$ contains more than one-half ones. Thus the first step is again repeated giving a matrix such as shown in table IV.

TABLE IV

| | |
|---|---|
| $W_1$ | 0100001 |
| $W_2$ | 0100010 |
| $W_3$ | 0010000 |
| $W_4$ | 0100011 |
| BCW | 0001000 |

It will now be seen that column 2 contains more than one-half ones. Thus step two is repeated, the result being shown in table V.

TABLE V

| | |
|---|---|
| $W_1$ | 0 0 0 0 0 0 1 |
| $W_2$ | 0 0 0 0 0 1 0 |
| $W_3$ | 0 1 1 0 0 0 0 |
| $W_4$ | 0 0 0 0 0 1 1 |
| BCW | 0 1 0 1 0 0 0 |

At this point it will be noted that no row or column contains more than half the number of ones in the rows and columns respectively. Thus a matrix represented by table V represents an optimum in solving the problems which limit such memories.

The steps above illustrated are repeated on any data matrix at the same time producing word control tag bits and a bit control word until the number of ones in all rows and all columns are not more than one half.

In the example shown in table V, by adding two additional ones in the bit control word and two additional ones in the word control tag bits the number of ones is reduced from 12 to 4. Most importantly, however, the load on the word driver is always one-half the number of bits and the OR gate need only have one-half the number of inputs as words.

Figure 2:
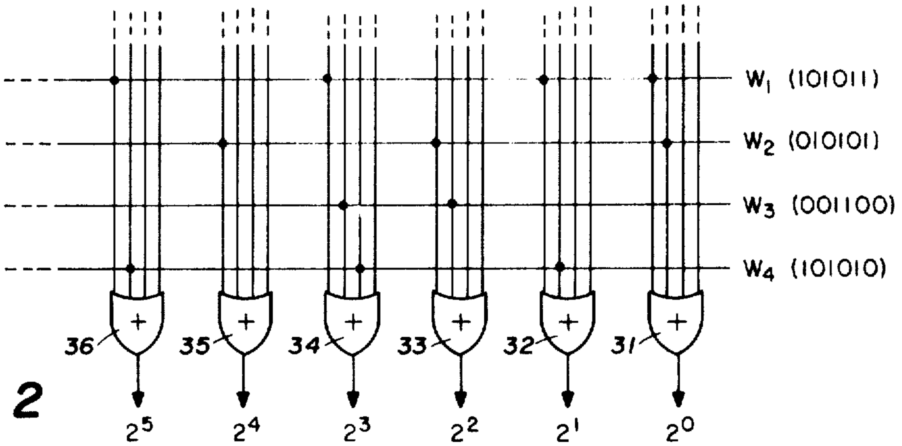
FIG. 2 illustrates the memory of FIG. 1 with diodes collected and shown as OR GATES.

In FIG. 2 the matrix of FIG. 1 has been shown wherein the OR gates have been included. The same reference characters have been employed in FIG. 2 as in FIG. 1. The connections between the word lines and the bit lines have been represented by a simple dot connection.

Output OR gates 31–36 each has four input lines leading thereto. OR gate 31 is connected to lines $W_1$ and $W_2$. OR gate 32 is connected to lines $W_1$ and $W_4$. OR gate 33 is connected to lines $W_2$ and $W_3$. OR gate 34 is connected to lines $W_1$, $W_3$ and $W_4$. OR gate 35 is connected to line $W_2$. OR gate 36 is connected to lines $W_1$ and $W_4$.

Figure 3:
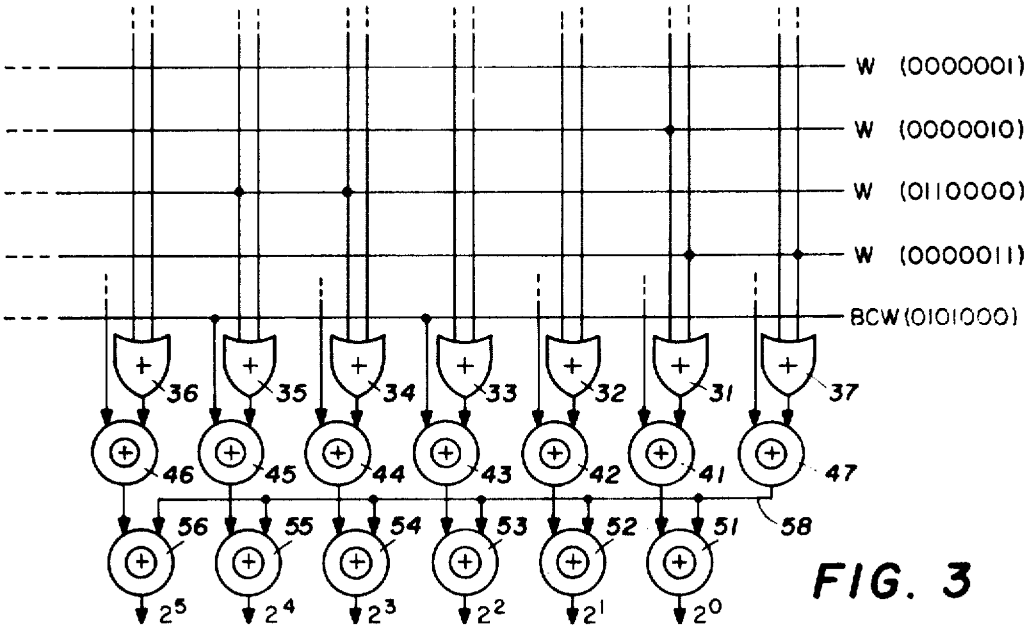
FIG. 3 illustrates the memory of FIGS. 1 and 2 to which the present invention has been applied.

In contrast to the matrix shown in FIGS. 1 and 2, note the simplified matrix with increased capabilities represented by FIG. 3. FIG. 3 is an embodiment of the present invention as applied to the matrix shown in table I, but as modified ultimately to correspond with the matrix shown in table V.

In FIG. 3 one additional OR gate 37 has been added for reading out the word control bits. A set of exclusive OR gates 41–47 are employed in order to read out and reconstruct the original word. OR gate 31 is connected to exclusive OR gate 41, the output of which is connected to exclusive OR gate 51. OR gate 32 is connected to exclusive OR gate 42, the output of which is connected to exclusive OR gate 52. The OR gate 33 is connected to exclusive OR gate 43. The second input of exclusive OR gate 43 is connected to the bit control word line. The output of exclusive OR gate 43 is connected to one input of exclusive Or gate 53.

The OR gate 34 is connected to one input of the exclusive OR gate 44, whose output is connected to one input of an exclusive OR gate 54. OR gate 35 is connected to one input of exclusive OR gate 45. The second input of exclusive OR gate 45 is connected to the bit control word line. The output of exclusive OR gate 45 is connected to one input of exclusive OR gate 55. OR gate 36 is connected to one input of exclusive OR gate 46 whose output is connected to one input of exclusive OR gate 56. The OR gate 37 is connected to one input of an exclusive OR gate 47 whose output serves to energize the line 58 which is connected to the second input of each of the exclusive OR gates 51–56. The output lines from the exclusive OR gates 51–56 are the bit output lines $2^0$–$2^5$ respectively.

The connections leading to the input of OR gate 37 correspond with the ones in the control word bit column of table V. The connections between the BCW line and the exclusive OR gates 41–46 correspond with the ones in the BCW word of table V.

The logic of FIG. 3 reconstructs the original desired word in the following manner.

$A_i$=$i^{th}$ bit of selected word
$B_i$=$i^{th}$ bit of bit control word
(readout on every cycle)
$C_w$=$A_c \oplus B_c$ Table – Continued $A_c$ is the control bit of the selected word
$B_c$ is the control bit of the bit control word

| $A_i$ | $B_i$ | $C_w$ | True Output |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

$$\text{Output} = \bar{A}\bar{B}C + \bar{A}B\bar{C} + A\bar{B}\bar{C} + ABC$$
$$= \bar{A}(\bar{B}C + B\bar{C}) + A(\bar{B}\bar{C} + BC)$$
$$= A_i \oplus B_i \oplus C_w$$

where $\oplus$ = exclusive OR.

To illustrate the readout of word 1.

| | |
|---|---|
| Word 1 = | 0 0 0 0 0 0 = $A$ |
| Bit Control Word | 0 1 0 1 0 0 0 = $B$ |
| $A \oplus B$= | 0 1 0 1 0 0 1 |
| $C_w$=1 | 1 1 1 1 1 1 |
| $A \oplus B \oplus C_w$= | 1 0 1 0 1 1 |

The latter is the desired word.

FIG. 3 illustrates the memory matrix with the output conversion circuits included. No word line is required to drive more than two loads and no OR gate requires more than two inputs.

While this read only memory has been described in terms of "AND" and "OR" gates, it should be obvious that other types of logic elements are equally applicable. Memories employing core rope, capacitor plates and linear transformers will benefit from the present invention to reduce loading and fan-in requirements.

Further it will be noted that the bit control word is used through logic including the exclusive OR gates 41–47. The bit control word may be mechanized through the use of OR gates 31–37 provided they have both the output and its complement. The connections between the AND gate 33, FIG. 3, and exclusive OR gate 53 may be structured without use of exclusive OR gate 43 by merely using the complement or OR gate 33 to feed the first input of exclusive OR gate 53. Thus where a bit control word is designated herein it will be understood that it ban be implemented either through the logic shown in FIG. 3 or by the selection of suitable taps on the complemented OR gates.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a read only memory wherein the presence or absence of an element in a storage matrix signifies a one and a zero respectively, means for enhancing the driving capability of a single word driver and enhancing the number of words which can be stored which comprises:

a. means representing the complement of each bit in a given word where the number of said elements in said given word exceeds one-half the number of word bits, b. means readable with said word for storing an index to the words hose bits are complemented;

c. means representing the complement of each bit in each column of said matrix in which the number of said elements exceeds one-half the number of bits in said a given column;

d. means readable with each said column for storing an index to the columns whose bits are complemented;

e. output OR gates in number corresponding with the number of bits in said words have inputs connected to each word line where one state is to be decoded, f. a tag bit OR gate connected to each word line where the word has been complemented, g. first exclusive OR gates each having one input supplied by one of said output OR gates, a tag exclusive OR gate having one input supplied by said tag bit OR gate, h. said first and tag exclusive OR gates each having a second input connected to a bit control word line for each column having bits complemented, and
i. second exclusive OR gates in number corresponding to the number of bits in each of said words each having one input supplied by the output of exclusive OR gates corresponding to said columns and all having a second input supplied by the output of the exclusive OR gate connected to said tag bit OR gate.

2. In a read only memory wherein the presence or absence of an element in a storage matrix signifies a one and a zero respectively, means for enhancing the driving capability of a single word driver and enhancing the number of words which can be stored which comprises:

a. means representing the complement of each bit in a given word where the number of said elements in said given word exceeds one-half the number of word bits,
b. means readable with said word for storing an index to the words whose bits are complemented;
c. means representing the complement of each bit in each column of said matrix in which the number of said elements exceeds one-half the number of bits in said a given column, and
d. means readable with each said column for storing an index to the columns whose bits are complemented, wherein the means representing the complement of each bit in each column of said matrix includes output OR gates having connections selectively made to the output or its complement to provide a mechanized bit control word.

3. In a read only computer memory matrix where the presence or absence of an element in a row or column of said matrix represents a one or a zero respectively, the method of enhancing the cooperation between said matrix and its drive and output system which comprises:

a. complementing all bits in each row and in each column of said matrix until the number of said elements in any given row or column is less than one-half the number of bits in any row or column,
b. storing a first set of tag bits representative of the rows complemented,
c. storing a second set of tag bits representative of the columns complemented, and
d. upon reading data represented by said ones and zeros from memory, reading from said sets of tag bits those tag bits which are representative of the rows and columns read from memory whereby correcting data read to represent intended memory data.

4. The method of claim 3 wherein signals read from memory are reconstructed to compensate for said complementing.

5. In a read only computer memory matrix where the presence or absence of an element signifies a one or a zero respectively, the method of enhancing the driving capability of single word drivers for reading from said memory, which comprises:

a. complementing all bits in each memory word wherein the number of said elements is greater than one-half the number of word bits,
b. storing in said memory a tag bit for each of said words which tag bit is indicative of said complementing, and
c. with the reading of each of said words from memory, reading said tag bit.

6. The method of claim 5 where, upon reading from said memory matrix selected bits are recomplemented to compensate for said complementing.

7. In a read only computer memory matrix wherein the presence or absence of an element in any column of said matrix represents a one or a zero respectively, the method of enhancing the number of words that can be stored in said memory within exceeding the number of inputs of OR gates at the memory output which comprises:

a. complementing all bits in each said column wherein the number of said elements exceeds more than one-half the number of bits in each said column,
b. storing in said memory a tab bit for each said column which bit is representative of said complementing, and
c. with the reading of each said column from said matrix, reading said tag bit,
d. and reconstructing the original memory data.